(12) United States Patent
Nishino et al.

(10) Patent No.: US 12,236,140 B2
(45) Date of Patent: Feb. 25, 2025

(54) STORAGE SYSTEM, DATA PROCESSING METHOD OF STORAGE SYSTEM, AND DATA PROCESSING PROGRAM OF STORAGE SYSTEM

(71) Applicant: Hitachi, Ltd., Tokyo (JP)

(72) Inventors: Tsuyoshi Nishino, Tokyo (JP); Tomohiro Yoshizawa, Tokyo (JP); Masahiro Ide, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/368,145

(22) Filed: Sep. 14, 2023

(65) Prior Publication Data

US 2024/0220166 A1 Jul. 4, 2024

(30) Foreign Application Priority Data

Dec. 28, 2022 (JP) .................................. 2022-212285

(51) Int. Cl.
*G06F 3/06* (2006.01)
(52) U.S. Cl.
CPC ............ *G06F 3/067* (2013.01); *G06F 3/0619* (2013.01); *G06F 3/0659* (2013.01)
(58) Field of Classification Search
CPC ...... G06F 3/067; G06F 3/0619; G06F 3/0659; G06F 3/061
USPC .................................................. 711/154, 100
See application file for complete search history.

(56) References Cited

U.S. PATENT DOCUMENTS

| 7,664,926 B2 * | 2/2010 | Kato ...................... G06F 12/023 711/170 |
| 2011/0264855 A1 * | 10/2011 | Kasako ................. G06F 3/0685 711/170 |
| 2022/0100381 A1 | 3/2022 | Masuda et al. |

FOREIGN PATENT DOCUMENTS

| JP | 11-102260 W | 4/1999 |
| JP | 2022-056151 A | 4/2022 |

OTHER PUBLICATIONS

Japanese Office Action received in corresponding Japanese Application No. 2022-212285 dated Sep. 3, 2024.

* cited by examiner

*Primary Examiner* — David Yi
*Assistant Examiner* — Zubair Ahmed
(74) *Attorney, Agent, or Firm* — MATTINGLY & MALUR, PC

(57) ABSTRACT

A storage system includes a storage device, a processor, and a storage unit. The processor provides a volume configured on the storage device to a mainframe server. The processor manages data handled by an open-architecture server, using a first slot having a first slot length as a unit, in the volume, and manages data handled by the mainframe server, using a second slot having a second slot length shorter than the first slot length as a unit, the first slot storing therein a predetermined number of the second slots, in the volume. The processor performs a process using one of the first slot and the second slot as a unit, depending on the type of the process.

15 Claims, 10 Drawing Sheets

FIG. 3

| EMULATION TYPE | OPEN | | | | MF | | | | | 121 |
| --- | --- | --- | --- | --- | --- | --- | --- | --- | --- | --- |
| | CU# | DEV# | HEAD SLOT ADDRESS | NUMBER OF SLOTS (GB) | EMULATION TYPE | CU# | DEV# | HEAD SLOT ADDRESS | NUMBER OF SLOTS (GB) | |
| OPEN-V | 00 | 00 | X | 12,522 (6) | 3390-3 | 10 | 00 | X | 16,732 (1) | |
| OPEN-V | 00 | 01 | Y | 37,564 | 3390-3 | 10 | 01 | A | 16,732 (1) | |
| OPEN-V | 01 | 00 | Z | 12,522 | — | — | — | — | — | |

FIG. 5

| LDEV | HDEV-SLOT | LDEV | HDEV-SLOT | SEGMENT |
|---|---|---|---|---|
| 00:00 | OPEN-SLOT#0 | 10:00 | MF-SLOT#0 | SEGMENT#0 |
| | | | MF-SLOT#1 | SEGMENT#1 |
| | | | MF-SLOT#2 | SEGMENT#2 |
| | | | MF-SLOT#3 | SEGMENT#3 |
| | OPEN-SLOT#1 | | MF-SLOT#4 | SEGMENT#4 |
| | | | MF-SLOT#5 | SEGMENT#5 |
| | | | MF-SLOT#6 | SEGMENT#6 |
| | | | MF-SLOT#7 | SEGMENT#7 |
| | ⋮ | | ⋮ | ⋮ |
| | OPEN-SLOT#4,174 | | MF-SLOT#16,696 | SEGMENT#16,696 |
| | | | MF-SLOT#16,697 | SEGMENT#16,697 |
| | | | MF-SLOT#16,698 | SEGMENT#16,698 |
| | | | MF-SLOT#16,699 | SEGMENT#16,699 |
| | ⋮ | | ⋮ | ⋮ |
| | OPEN-SLOT#4,182 | | MF-SLOT#16,728 | SEGMENT#16,728 |
| | | | MF-SLOT#16,729 | SEGMENT#16,729 |
| | | | MF-SLOT#16,730 | SEGMENT#16,730 |
| | | | MF-SLOT#16,731 | SEGMENT#16,731 |
| | ⋮ | | ⋮ | ⋮ |
| | OPEN-SLOT#24,576 | | | SEGMENT#98,304 |
| | | | | SEGMENT#98,305 |
| | | | | SEGMENT#98,306 |
| | | | | SEGMENT#98,307 |

| OPEN-SLOT# | SS DATA SLOT# | BACKUP COPY REQUIREMENT/ NON-REQUIREMENT | 124 |
|---|---|---|---|
| 0 | A | REQUIRED | |
| 1 | B | REQUIRED | |
| 4,174 | C | NOT REQUIRED | |
| 4,182 | D | NOT REQUIRED | |
| 24,576 | E | NOT REQUIRED | |

# STORAGE SYSTEM, DATA PROCESSING METHOD OF STORAGE SYSTEM, AND DATA PROCESSING PROGRAM OF STORAGE SYSTEM

CROSS-REFERENCE TO RELATED APPLICATION

The present application claims priority from Japanese application JP2022-212285, filed on Dec. 28, 2022, the content of which is hereby incorporated by reference into this application.

BACKGROUND OF THE INVENTION

1. Field of the Invention

The present invention relates to a storage system, a data processing method of a storage system, and a data processing program of a storage system.

2. Description of the Related Art

Conventionally, a mainframe system built with a mainframe server has been used as a backbone system of organizations, such as enterprises or government organizations. In recent years, in response to a demand for building a system at a lower cost, open-architecture systems built with open-architecture servers, conforming to open architectures, have come to be put in use. Because mainframe systems are more reliable than open-architecture systems, mainframe systems are still in use as systems requiring high reliability. Therefore, mainframe systems and open-architecture systems are both currently present.

In such a circumstance, a technique for cutting the redundancy in development efforts of mainframe systems and open-architecture systems has been supposed (for example, see JP 2022-056151 A). With such a technique, the mainframe systems can make use of functions of the open-architecture systems, by enabling interoperation with the open-architecture systems.

SUMMARY OF THE INVENTION

However, in the conventional technique described in JP 2022-056151 A, to allow the mainframe system to interoperate with an open-architecture system, it is necessary to provide a separate storage for this interoperation, and hardware and system development costs have been burdensome.

The present invention has been made in view of the background described above, and an object of the present invention is to provide a function of an open-architecture system to a mainframe system at a lower cost.

According to one aspect of the present invention, a storage system includes: a storage device; a processor; and a storage unit, in which the processor is configured to: provide a volume configured on the storage device to a mainframe server; manage data handled by an open-architecture server, using a first slot having a first slot length as a unit, in the volume; manage data handled by the mainframe server, using a second slot having a second slot length shorter than the first slot length as a unit, the first slot storing therein a predetermined number of the second slots, in the volume; and perform a process using one of the first slot and the second slot as a unit, depending on a type of the process.

According to the one aspect of the present application, it is possible to provide a function of an open-architecture system to a mainframe system at a lower cost.

BRIEF DESCRIPTION OF THE DRAWINGS

FIG. 3 is a diagram illustrating a configuration of a VDEV area configuration range mapping table;
FIG. 5 is a diagram illustrating a configuration of an HDEV-SLOT definition table;
FIG. 6 is a diagram illustrating a configuration of an HDEV-SLOT/SS data mapping table.

DESCRIPTION OF THE PREFERRED EMBODIMENTS

Figure 1:
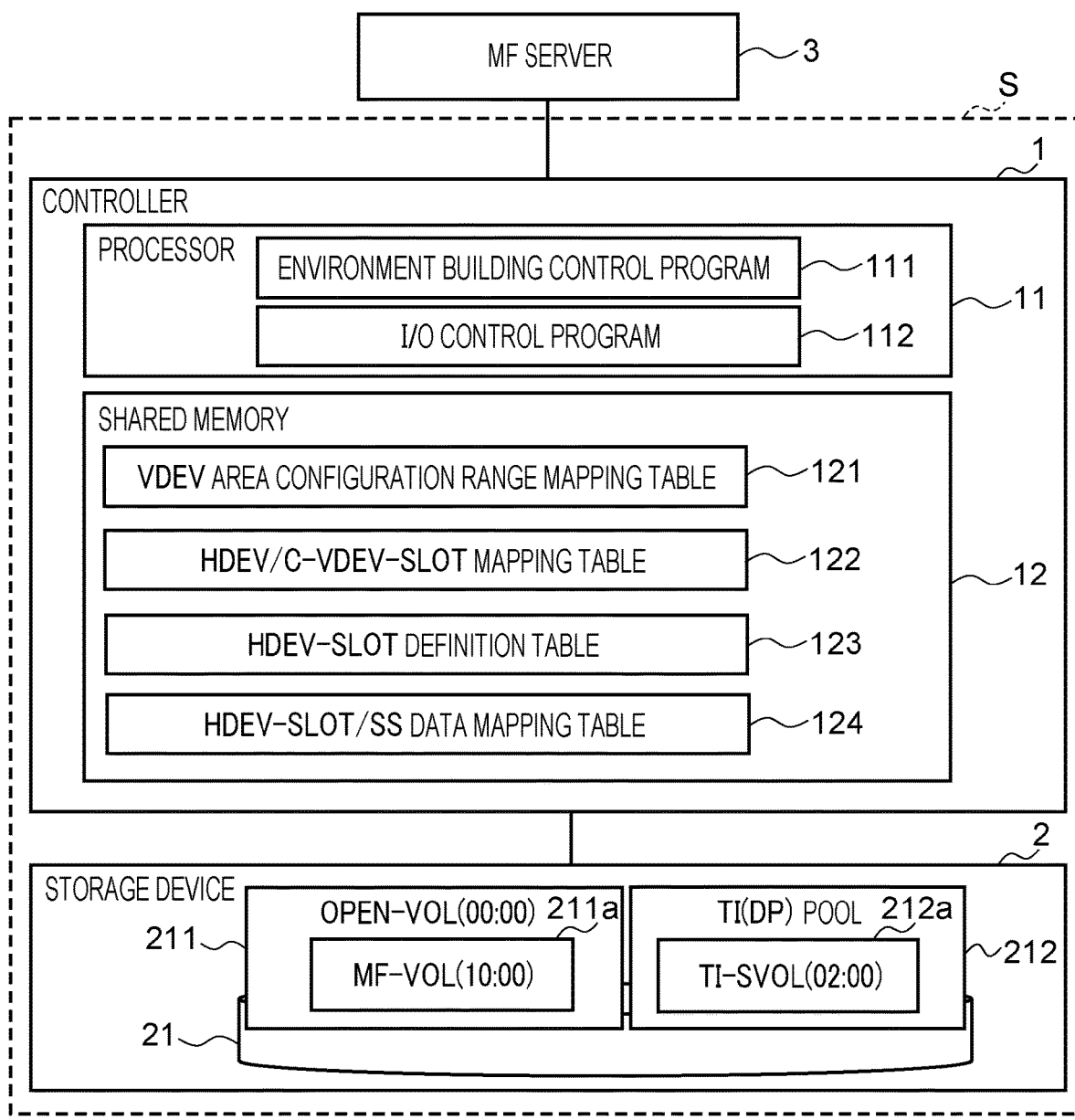
FIG. 1 is a diagram illustrating a configuration of a storage system according to an embodiment.

A preferred embodiment according to the disclosure of the present application will be described below with reference to the drawings. The embodiment is an example for explaining the present application including the drawings. In the embodiment, for clarity of description, some omission and simplification are made, as appropriate. Each component may be provided in a plurality or singularity, unless a limitation is given otherwise. In addition, a combination of one embodiment and another embodiment also falls within the scope of the embodiment of the present application.

In the following embodiment and examples, the same or similar components are denoted by the same reference numerals, and descriptions thereof are sometimes omitted, or only the description focusing on the difference is sometimes provided. In addition, when the same or similar components are included in plurality, such components are sometimes explained by assigning different subscripts to the same reference numeral. In addition, when it is not necessary to distinguish the plurality of components, the subscripts are sometimes omitted in descriptions. The number of each component may be singular or plural unless specified otherwise.

In the embodiment, a process executed by a program is sometimes described. A computer causes a processor (such as a central processing unit (CPU) or a graphics processing unit (GPU)) to execute a process described in a program, using a memory or the like in a main storage device. Therefore, a processor may be considered as the entity performing the process by executing a program. The functional unit executing a process is implemented by causing a processor to execute the program.

In the same manner, the entity performing the process by executing a program may be a controller, a device, a system, a computer, or a node including a processor. The entity performing the process by executing a program may be any computing unit, and may also include a dedicated circuit for executing specific process. Examples of the dedicated circuit include a field-programmable gate array (FPGA) and an application-specific integrated circuit (ASIC).

The program may be installed from a program source onto a computer. The program source may be a non-transitory storage medium that is readable by a program distribution server or a computer, for example. When the program source is a program distribution server, the program distribution server may include a processor and a storage resource (storage) that stores therein the program to be distributed, and a processor included in the program distribution server may distribute the program to be distributed, to another computer. In the embodiment, two or more programs may be implemented as one program, or one program may be implemented as two or more programs.

Embodiment (Configuration of Storage System S)

FIG. 1 is a diagram illustrating a configuration of a storage system S according to an embodiment. The storage system S is connected to a main frame (MF) server 3, via a communication line such as a storage area network (SAN).

The storage system S includes a controller 1 and a storage device 2. The controller 1 includes a processor 11 causing an environment building control program 111 and an I/O control program 112 to operate, and a shared memory 12. One or more storage devices 2 are connected to the controller 1.

Upon being requested for an I/O from the MF server 3, and for execution of a predetermined function (e.g., snapshot) from a manager terminal (not illustrated), the processor 11 acquires or updates information retained on the shared memory 12.

The shared memory 12 also retains a VDEV area configuration range mapping table 121, an HDEV/C-VDEV-SLOT mapping table 122, an HDEV-SLOT definition table 123, and an HDEV-SLOT/SS data mapping table 124. The shared memory 12 also includes a cache memory that temporarily stores therein write data to be written to the storage device 2 and read data read from the storage device 2, responding to an I/O request from the MF server 3.

The storage device 2 includes one or more drive devices 21. The processor 11 accesses the drive device 21 via a drive interface (not illustrated). The drive device 21 is, for example, a hard disk drive (HDD) using a storage medium such as a magnetic disk, or a solid state drive (SSD) using a storage medium such as a flash memory.

The drive device 21 includes an open-architecture volume (OPEN-VOL) 211, as a storage area. The drive device 21 also includes a thin image (TI) (dynamic provisioning (DP)) pool 212, as a storage area for storing therein a snapshot (SS) of the OPEN-VOL 211.

The storage system S provides a MF-VOL 211a that is a volume for a mainframe server, as a data storage resource for the MF server 3. The storage device 2 maps the volume for the MF server 3 (MF-VOL) to an OPEN-VOL, so as to enable the MF server 3 to access the MF-VOL 211a, and to make a predetermined function for supporting the OPEN-VOL 211 (e.g., a snapshot) available to the MF server 3.

In other words, the storage device 2 stores therein MF-SLOTs making up the MF-VOL 211a, in an OPEN-SLOT having a slot length longer than the slot length of the MF-SLOT. The storage device 2 operates as a MF-SLOT in response to an I/O request from the MF server 3 addressed to an MF-VOL 211a, and operates as OPEN-SLOT to operate a function of the OPEN-VOL 211.

(Relationship Between OPEN-SLOT 2110S and MF-SLOT 211MS)

Figure 2:
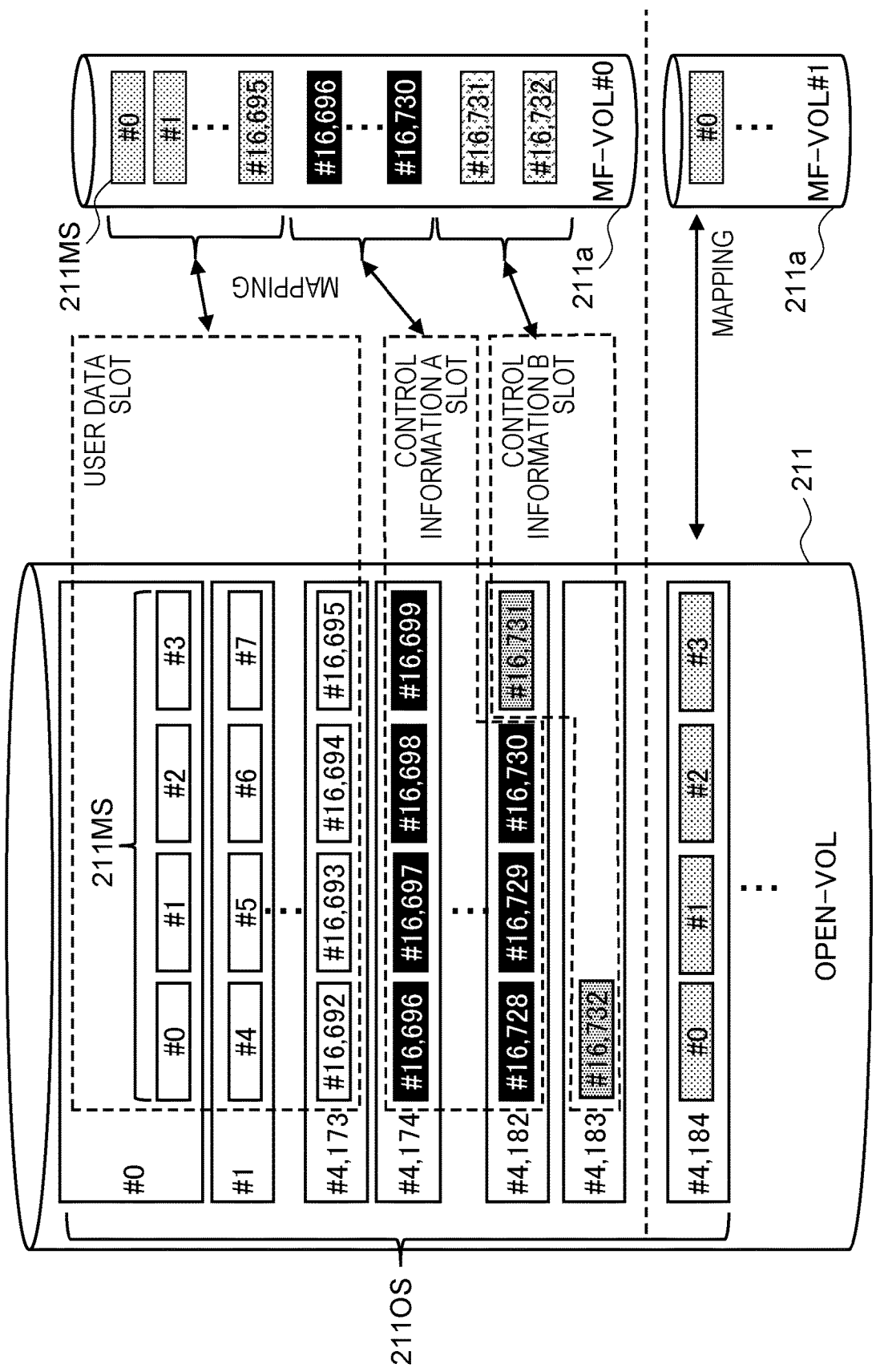
FIG. 2 is a diagram for explaining a relationship between an OPEN-SLOT and an MF-SLOT.

FIG. 2 is a diagram for explaining a relationship between an OPEN-SLOT 2110S (first slot) and a MF-SLOT 211MS (second slot). A volume VOL (HDEV) is managed in units of a slot regardless of the volume type, such as an OPEN-VOL for an open-architecture server, an MF-VOL for a mainframe server, and a TI-SVOL for a snapshot. This is because data is handled in units of a slot length in the cache memory.

As illustrated in FIG. 2, a plurality of OPEN-SLOTS 2110S are provided in an OPEN-VOL 211. A predetermined number (four in the present embodiment) of MF-SLOTs 211MS are stored in each of the plurality of OPEN-SLOTS 2110S. There three are types in the MF-SLOTs 211MS: a control information A slot for storing therein control information A; a control information B slot for storing therein control information B; and a user data slot for storing therein user data. The control information is information specific to the data handled in the mainframe, and stores therein information regarding a format, data length, and the like for user data corresponding thereto.

The plurality of MF-SLOTS 211MS in the MF-VOL 211a are mapped, e.g., in units of four consecutive MF-SLOTs 211MS, to the OPEN-SLOTs 2110S. The slots in each of the MF-VOLs 211a are mapped in the same manner.

The controller 1 performs a process in units of an OPEN-SLOT 2110S or an MS-SLOT 211MS, depending on the type of the process (whether the type is an I/O process or a predetermined function such as a snapshot).

(VDEV Area Configuration Range Mapping Table 121)

FIG. 3 is a diagram illustrating a configuration of the VDEV area configuration range mapping table 121. The VDEV area configuration range mapping table 121 indicates mapping relationship between the OPEN-SLOTs 2110S created for each OPEN-VOL 211, and a MF-VOL 211a mapped to the OPEN-SLOT 2110S, in terms of a range of the area configuration in a virtual drive. The VDEV area configuration range mapping table 121 indicates mapping relationship between an OPEN-SLOT 2110S and a MF-VOL 211a, as a range of the VDEV area configuration, represented by a combination of CU #, DEV #, a head slot address, and the number of slots (GB).

CU # is identification information of the controller 1. DEV # is identification information of an OPEN-VOL 211 or an MF-VOL 211a. The head slot address is the head address of the OPEN-VOL 211 or the MF-VOL 211a. The number of slots (GB) is the number of slots and the capacity thereof in the OPEN-VOL 211 or the MF-VOL 211a identified by the DEV #.

(HDEV/C-VDEV-SLOT Mapping Table 122)

Figure 4:
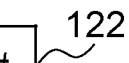
FIG. 4 is a diagram illustrating a configuration of an HDEV/C-VDEV-SLOT mapping table.

FIG. 4 is a diagram illustrating a configuration of the HDEV/C-VDEV-SLOT mapping table 122. The HDEV/C-VDEV-SLOT mapping table 122 indicates a mapping relationship between a MF-SLOT 211MS and a slot on a cache memory built on the shared memory 12. HDEV-SLOT # is identification information (slot number) of the MF-SLOT 211MS. C-VDEV-SLOT # is identification information (slot number) of a slot on the cache memory configured in the shared memory 12.

(HDEV-SLOT Definition Table 123)

FIG. 5 is a diagram illustrating a configuration of the HDEV-SLOT definition table 123. The HDEV-SLOT definition table 123 indicates a mapping relationship between an OPEN-SLOT 2110S created for each OPEN-VOL 211, and the MF-VOL 211a mapped to the OPEN-SLOT 2110S. The HDEV-SLOT definition table 123 indicates a mapping relationship among an identification information OPEN-SLOT # (slot number) of an OPEN-SLOT 2110S, the identification information MS-SLOT # (slot number) of an MF-SLOT 211MS, and the identification information SEGMENT # (segment number) of a segment.

Note that the HDEV-SLOT definition table 123 is used in looking up the OPEN-SLOT # from the MS-SLOT # corresponding thereto. The HDEV-SLOT definition table 123 may also be omitted because the OPEN-SLOT # corresponding to the MS-SLOT # can be calculated based on the VDEV area configuration range mapping table 121.

(HDEV-SLOT/SS Data Mapping Table 124)

FIG. 6 is a diagram illustrating a configuration of the HDEV-SLOT/SS data mapping table 124. The HDEV-SLOT/SS data mapping table 124 indicates a mapping relationship between OPEN-SLOTs 2110S created for each OPEN-VOL 211, an SS data slot including the TI-SVOL 212a, and a backup copy requirement/non-requirement.

(Environment Building Process for Mapping MF-VOL 211a to OPEN-VOL 211)

Figure 7:
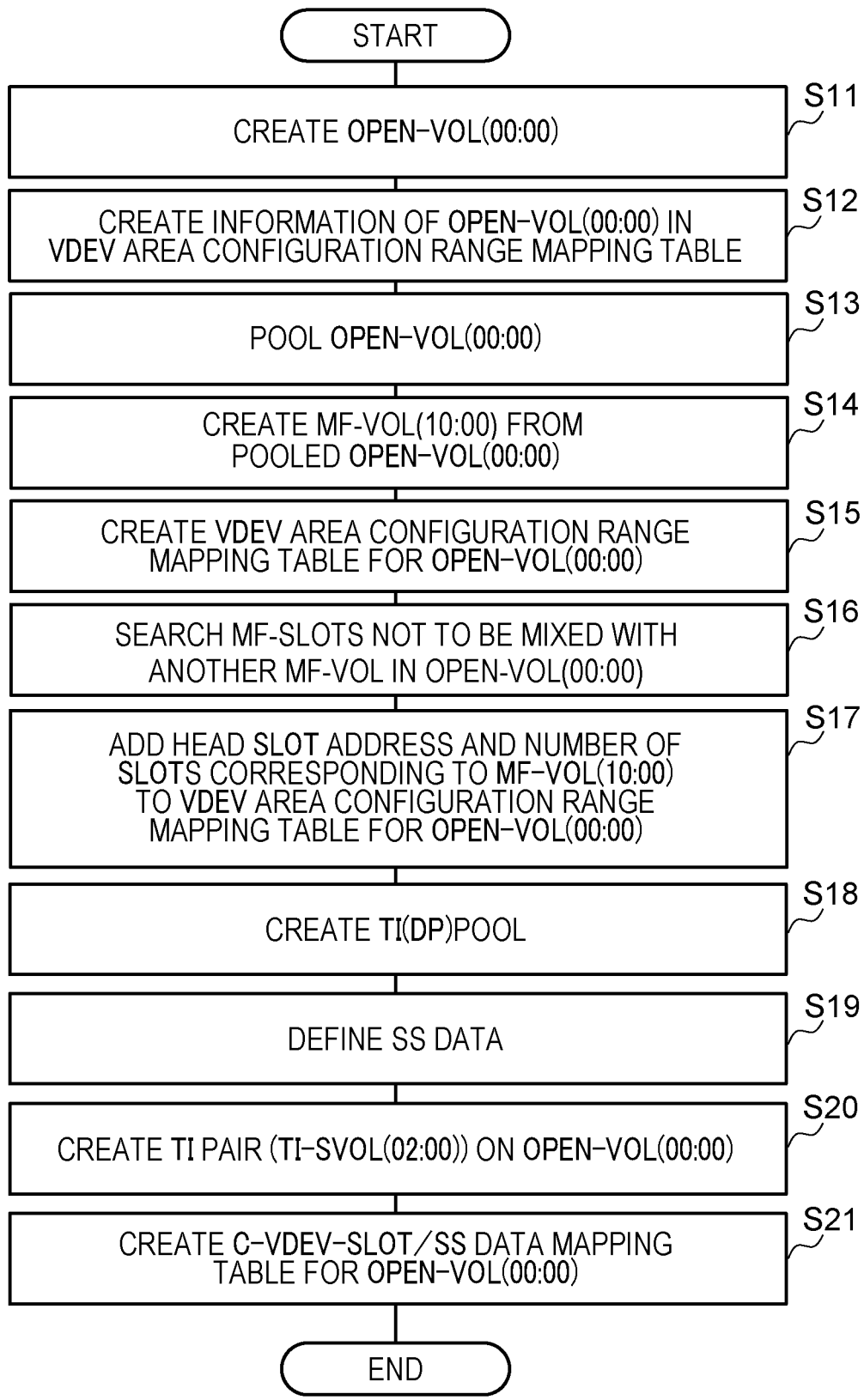
FIG. 7 is a flowchart illustrating an environment building process.

FIG. 7 is a flowchart illustrating an environment building process for building an environment in which the MF-VOL 211a is mapped to the OPEN-VOL 211. Explained in FIG. 7 is an environment building process in which the MF-VOL 211a identified by (CU #:DEV #)=(10:00) is mapped to the OPEN-VOL 211 identified by (CU #:DEV #)=(00:00).

To begin with, in step S11, an environment building control program 111 (FIG. 1) creates an OPEN-VOL (00:00) in the storage device 2, based on a user instruction.

Next, in step S12, the environment building control program 111 creates information of the OPEN-VOL (00:00) in the VDEV area configuration range mapping table 121 (FIG. 3). The information of the OPEN-VOL (00:00) in the VDEV area configuration range mapping table 121 herein is information (CU #:DEV #)=(00:00) in the "OPEN" column, in the left half of the VDEV area configuration range mapping table 121. Next, in step S13, the environment building control program 111 pools the OPEN-VOL (00:00), based on a user instruction.

Next, in step S14, the environment building control program 111 creates the MF-VOL (10:00), from the pooled OPEN-VOL (00:00), based on a user instruction.

Next, in step S15, the environment building control program 111 creates mapping information mapping the OPEN-VOL (00:00) to the MF-VOL (10:00), in the VDEV area configuration range mapping table 121. This mapping information is information corresponding to (CU #:DEV #)=(10:00), in the "MF" column in the right half of the VDEV area configuration range mapping table 121.

Next, in step S16, the environment building control program 111 searches the VDEV area configuration range mapping table 121. The environment building control program 111 then extracts the range corresponding to slots of the MF-VOL (10:00) from the slot range corresponding to the OPEN-VOL (00:00) (OPEN-SLOT #0 to 12,521), so that the MF-SLOTs corresponding to the MF-VOL are continuous without being mixed with MF-SLOTs of another MF-VOL. In this manner, it is possible to prevent MF-SLOTs of the same MF-VOLs from becoming scattered, and the access speed from being decreased.

Next, in step S17, the environment building control program 111 adds the head slot address and the number of slots corresponding to the MF-VOL (10:00) extracted in step S16, to the VDEV area configuration range mapping table 121.

Next, in step S18, the environment building control program 111 creates a TI (DP) pool 212 for snapshots of the OPEN-VOL (00:00) including the MF-VOL (10:00) created in step S14, based on a user instruction.

Next, in step S19, the environment building control program 111 defines snapshot data for the OPEN-VOL (00:00). Next, in step S20, the environment building control program 111 creates a TI pair having the OPEN-VOL (00:00) 211 as a primary volume, and the TI-SVOL (02:00) 212a as a secondary volume, based on a user instruction.

Next, in step S21, the environment building control program 111 creates the HDEV/C-VDEV-SLOT mapping table 122, the HDEV-SLOT definition table 123, and the HDEV-SLOT/SS data mapping table 124, for the OPEN-VOL (00:00).

(Process Upon Receiving Write I/O (Request for Data Writing Process) from MF Server 3)

Figure 8:
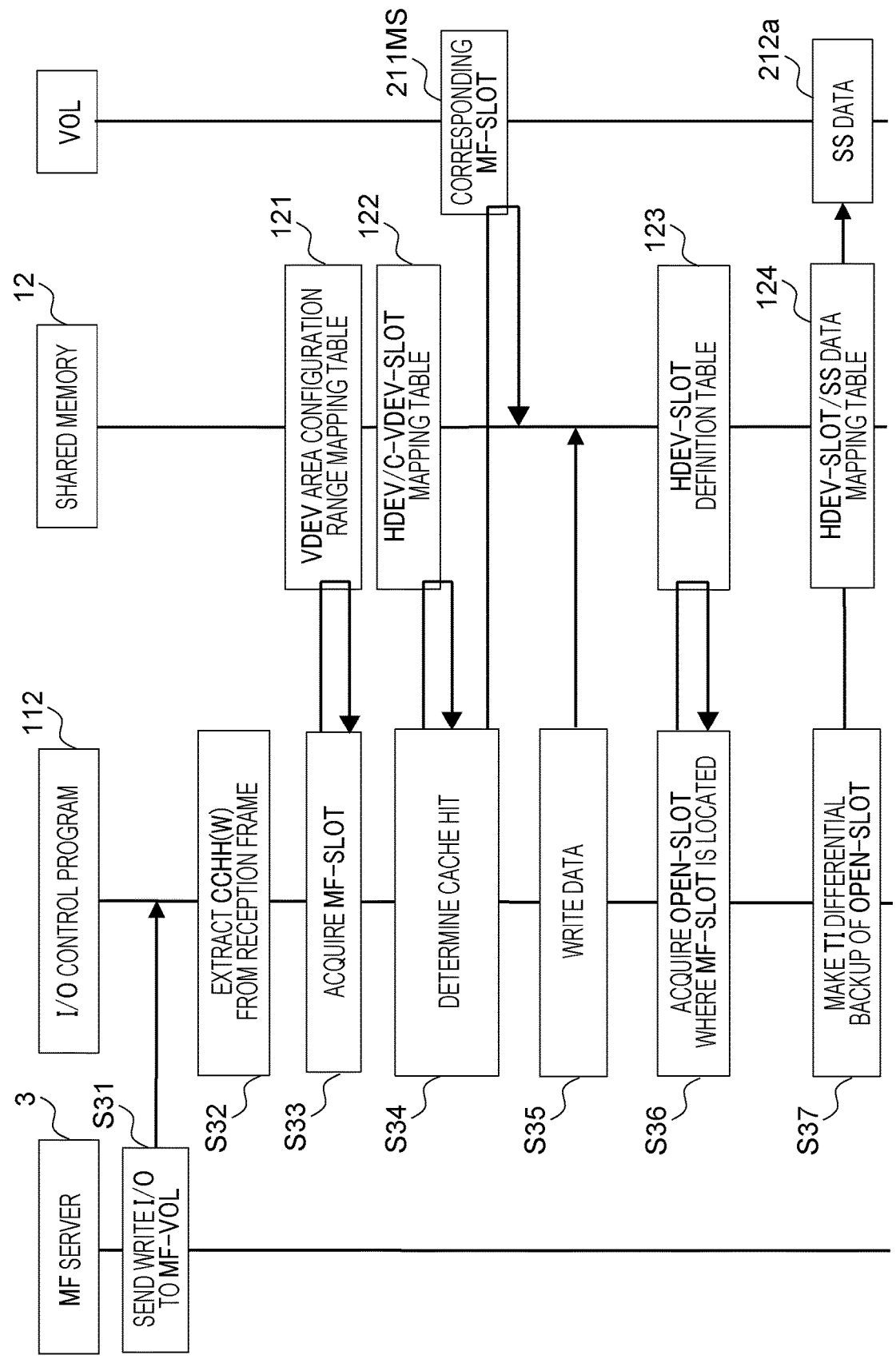
FIG. 8 is a sequence chart illustrating a process from receiving a Write I/O from the MF server to taking TI differential backup.

FIG. 8 is a sequence chart illustrating a sequence from receiving Write I/O from the MF server 3 to the process of TI differential backup. FIG. 8 illustrates a process executed responding to a Write I/O from the MF server 3, by designating a cylinder head number of the MF-VOL (10:00) corresponding to the write target.

To begin with, in step S31, the MF server 3 issues a Write I/O to the MF-VOL 211a. Next, in step S32, the I/O control program 112 (FIG. 1) of the controller 1 extracts the cylinder head number CCHH (W) of the target to which the write data is written, from the reception frame from the MF server 3. The cylinder head number CCHH (W) of the write target is destination information.

Next, in step S33, the I/O control program 112 refers to the VDEV area configuration range mapping table 121. Identification information MF-SLOT # of the write target MF-SLOT 211MS is then calculated from the cylinder head number CCHH (W) extracted in step S32 and a predetermined calculation formula. It is assumed herein that MF-SLOT #=3, 16,697, and 16,731 are obtained from the calculation. This calculation results indicate that the user data slot is #3; the control information A slot is #16,697; and the control information B slot is #16,731.

Next, in step S34, the I/O control program 112 refers to the HDEV/C-VDEV-SLOT mapping table 122, and determines whether there is a cache hit for MF-SLOT #(HDEV-SLOT #) calculated in step S33. Referring to the HDEV/C-VDEV-SLOT mapping table 122, MF-SLOT #=3, 16,697, and 16,731 correspond to SLOT #16,696, 0, and 1, respectively, in the cache memory. The I/O control program 112 performs staging of the slots having the OPEN-SLOT # determined as a cache miss in step S34, on the cache memory.

Next, in step S35, the I/O control program 112 writes the write data to the cache memory. The I/O control program 112 also writes the write data to the MF-VOL 211a, based on the destination information of the write data.

Next, in step S36, the I/O control program 112 refers to the HDEV-SLOT definition table 123, and acquires OPEN-SLOT in which the MF-SLOTs acquired in step S33 are located. Referring to the HDEV-SLOT definition table 123, OPEN-SLOT # where the MF-SLOT #=3, 16,697, and 16,731 are located are 0, 4,174, and 4,182, respectively.

Next, in step S37, the I/O control program 112 makes a TI differential backup of the OPEN-SLOT 2110S acquired in step S36, to the TI-SVOL (02:00) 212a. For the OPEN-SLOT 2110S with a backup copy requirement/non-requirement set to "required" in the HDEV-SLOT/SS data mapping table 124, the I/O control program 112 creates a backup copy, and then makes a TI differential backup. With this TI differential backup, a new snapshot of the MF-VOL 211a is stored in the TI-SVOL (02:00) 212a.

(Process Upon Receiving Read I/O (Request for Reading Data) from MF Server 3)

Figure 9:
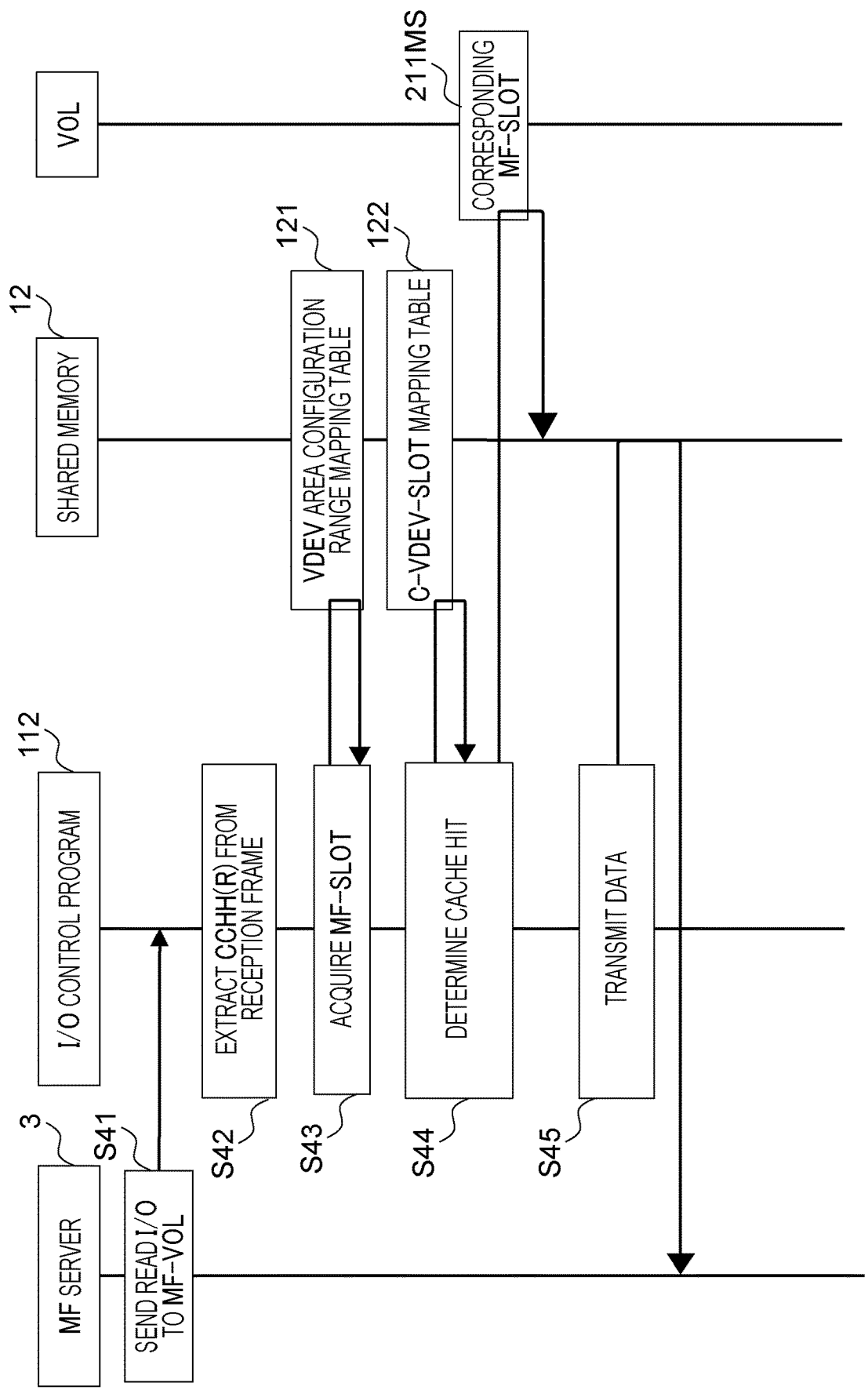
FIG. 9 is a sequence chart illustrating a process performed when a Read I/O is received from an MF server.

FIG. 9 is a sequence chart illustrating the sequence performed when a Read I/O is received from the MF server 3. FIG. 9 illustrates a process executed responding to the Read I/O from the MF server 3, with a designation of a cylinder head number of the MF-VOL (10:00) that is the volume of the read target.

To begin with, in step S41, the MF server 3 issues a Read I/O to the MF-VOL 211a. Next, in step S42, the I/O control program 112 (FIG. 1) of the controller 1 extracts the cylinder head number CCHH (R) of the target volume from which read data is read, from the reception frame from the MF server 3.

Next, in step S43, the I/O control program 112 refers to the VDEV area configuration range mapping table 121. Identification information MF-SLOT # of the read target MF-SLOT 211MS is then calculated from the cylinder head number CCHH (R) extracted in step S42 and a predetermined calculation formula. It is assumed herein that MF-SLOT #=3, 16,697, and 16,731 are obtained from the calculation.

Next, in step S44, the I/O control program 112 refers to the HDEV/C-VDEV-SLOT mapping table 122, and determines a cache hit MF-SLOT #(HDEV-SLOT #) calculated in step S43. Referring to the HDEV/C-VDEV-SLOT mapping table 122, MF-SLOT #=3, 16,697, and 16,731 correspond to SLOT #16,696, 0, and 1, respectively, in the cache memory. The I/O control program 112 performs staging the slot of the OPEN-SLOT # determined as a cache miss in step S44, in the cache memory.

Next, in step S45, the I/O control program 112 reads the target read data from the cache memory, and transmits the read data to the MF server 3.

In response to an I/O request for deleting data from the MF server, the MF-SLOT 211MS for storing therein the data to be deleted is identified, and the data to be deleted is deleted from the identified MF-SLOT 211MS and the cache memory.

Although not illustrated, upon receiving a request for acquiring a snapshot from the MF server 3, the I/O control program 112 acquires the snapshot. Upon receiving a request for acquiring a snapshot from the MF server 3, the I/O control program 112 reads the designated snapshot data from the corresponding TI-SVOL 212a, and provides the snapshot data. Because the TI-SVOL 212a is a differential backup of the MF-VOL 211a, the snapshot data can be acquired by executing the same process as that performed upon receiving the above-described Read I/O (request for reading data), to the corresponding TI-SVOL 212a.

(GUI Screen 50 for TI Differential Backup Process)

Figure 10:
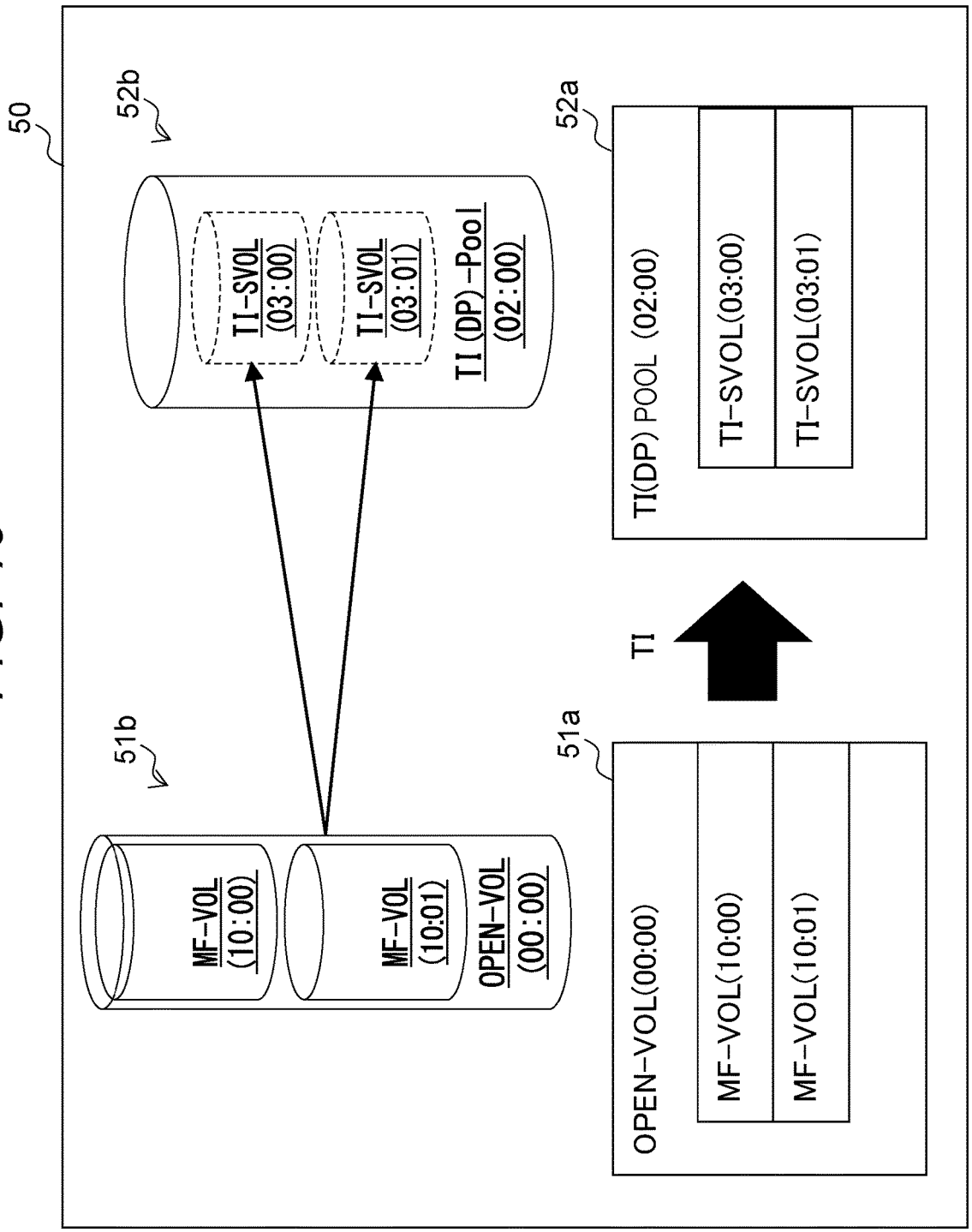
FIG. 10 is a diagram illustrating a GUI screen for a TI differential backup process of OPEN-VOL including MF-VOL.

FIG. 10 is a diagram illustrating a GUI screen 50 for a TI differential backup process for the OPEN-VOL 211 including the MF-VOL 211a.

The GUI screen 50 displays a logical representation 51a and a visual representation 51b of the OPEN-VOL 211 (00:00) including the MF-VOLS 211a ((10:00), (10:01)) that are the target volumes of the differential backup process. The GUI screen 50 also displays a logical representation 52a and a visual representation 52b of the snapshot volumes TI-SVOLs 212a ((03:00), (03:01)) created in the TI (DP) pool 212 (02:00). A TI-SVOL 212a stores therein snapshot data defined as a target of the differential backup process.

By displaying the GUI screen 50 in the manner described above, the administrator can get a grasp of the relationship among the OPEN-VOL 211, the MF-VOLS 211a, the TI (DP) pool 212, and the TI-SVOLs 212a, intuitively.

(Regarding Predetermined Function Supporting OPEN-VOL)

In the above embodiment, as an example of the OPEN-VOL function executed to an OPEN-VOL including an MF-VOL, a function for saving a differential snapshot (Thin Image (TI)) has been explained. OPEN-VOL functions that can be performed to an OPEN-VOL including an MF-VOL is not limited to the TI. Examples of the functions may include, in addition to the TI, at least one of a function of allowing a group of volumes created in a plurality of storage systems to retain the same data (Global-active device (GAD)); data compression or deduplication run on each of the storage systems (Adaptive Data reduction (ADR)); and representational state transfer (REST) application programming interface (API).

Other examples of such functions may also include a function of creating a replication volume of a data volume on the same storage system (ShadowImage (SI)), a function of creating/retaining a replication of a volume on a remote location (TrueCopy (TC)), a function of installing a secondary site storage system in a remote location and copying data to a secondary volume in the secondary site asynchronously with writing of the data to the primary volume in the primary site (Universal Replicator (UR)), and a copy function.

Effects Achieved by Embodiment

In the embodiment described above, processes are performed either in units of an OPEN-SLOT or units of an MF-SLOT, depending on the type of the process (whether the process is an I/O process or a predetermined function applied to an OPEN-VOL). Therefore, existing functions only supporting OPEN-VOLs can be made used for the MF-VOLS. In addition, in future new function development, merely by making the development efforts for OPEN-VOLS, MF-VOLs will also be supported. Therefore, it is possible to omit redundancy in the development efforts.

In the embodiment described above, when an I/O processing request is received from a mainframe server, the MF-SLOT for storing therein the target data for which the I/O process is requested is identified based on the VDEV area configuration range mapping table 121 (FIG. 3), and the target data is subjected to the I/O process in units of a MF-SLOT. Therefore, by giving two aspects to the same data (slot/segment), when the volume is operated as an MF-VOL (e.g., I/O to MF-VOL), the data is handled as an MF-SLOT. By contrast, when the volume is caused to operate as an OPEN-VOL (e.g., TI differential backup), data can be handled as an OPEN-SLOT.

Although one embodiment of the present invention has been described in detail above, the present invention is not limited to the embodiment described above, and various modifications may be made within the scope not departing from the gist of the present invention. For example, the embodiment has been described above in detail to facilitate understanding of the present invention, and therefore, is not necessarily limited to the configuration including all of the elements described above. In addition, another configuration may be added to, deleted from, and substituted for a part of the configuration according to the embodiment described above.

In addition, some or all of the configurations, the functional units, the processing unit, the processing means or like explained above may be implemented as hardware, through designing of an integrated circuit, for example. In addition, each of the configurations, the functions, and the like described above may be implemented as software by causing a processor to parse and to execute a program implementing the function. Information such as a program, a table, and a file for implementing each of the functions may be stored in a recording device such as a memory, a hard disk, and a solid-state drive (SSD), a recording medium such as an IC card, an SD card, and a digital versatile disk (DVD).

In each of the drawings described above, control lines and information lines presented are those considered to be necessary for the explanation, and are not necessarily the representations of all of the control lines and the information lines in implementations. For example, in reality, it may be considered that almost all of the configurations are connected to one another.

In addition, the functions of the storage system S, the controller 1, and the storage device 2 described above, and the arrangements of data therein are merely examples. The functions of the storage system S, the controller 1, and the storage device 2 and the arrangements of data therein may be changed to optimal arrangements, from the viewpoint of performance, processing efficiency, communication efficiency, and the like of hardware and software provided to these system, controller, and device.

What is claimed is:

1. A storage system comprising:
   a storage device;
   a processor; and
   a storage unit, wherein
   the processor is configured to:
   provide a volume configured on the storage device to a mainframe server;
   manage data handled by an open-architecture server, using a first slot having a first slot length as a unit, in the volume;
   manage data handled by the mainframe server, using a second slot having a second slot length shorter than the first slot length as a unit, the first slot storing therein a predetermined number of the second slots, in the volume; and
   perform a process using one of the first slot and the second slot as a unit, depending on a type of the process.

2. The storage system according to claim 1, wherein
   mapping information indicating a mapping relationship between the first slot and the second slot in the volume is stored in the storage unit, and
   the processor is further configured to, when a request for an I/O process is received from the mainframe server, identify the second slot for storing therein target data for which the I/O process is requested, based on the mapping information, and the I/O process is performed on the target data, using the second slot as a unit.

3. The storage system according to claim 2, wherein the processor is further configured to:
   calculate a slot number of the second slot in which a piece of write data received from the mainframe server is to be stored, based on a predetermined calculation formula and destination information included in a reception frame for storing therein a write request for the piece of write data; and
   determine whether the second slot corresponding to the slot number is retained on a cache memory configured on the storage unit, and
   when it is determined that the second slot corresponding to the slot number is retained on the cache memory, write the piece of write data to the second slot retained on the cache memory, and
   when it is determined that the second slot corresponding to the slot number is not retained in the cache memory, acquire the second slot corresponding to the slot number from the volume, and retain the second slot on the cache memory, and write the piece of write data to the second slot retained on the cache memory.

4. The storage system according to claim 2, wherein the processor is further configured to:
   calculate a slot number of the second slot for storing therein a piece of read data, based on a predetermined calculation formula and destination information included in a reception frame for storing a request for reading the piece of read data, the reception frame being received from the mainframe server;
   determine whether the second slot corresponding to the slot number is retained on a cache memory configured on the storage unit;
   when it is determined that the second slot corresponding to the slot number is retained on the cache memory, read the piece of read data from the second slot retained in the cache memory; and
   when it is determined that the second slot corresponding to the slot number is not retained on the cache memory, acquire the second slot corresponding to the slot number from the volume, and retain the second slot on the cache memory, and read the piece of read data from the second slot retained on the cache memory.

5. The storage system according to claim 2, wherein the processor is further configured to:
   create an open-architecture volume including the first slot, on the storage device;
   pool the created open-architecture volume;
   create a mainframe volume including the second slots from the pooled open-architecture volume, the first slot storing therein the predetermined number of the second slots;
   create a range of the first slots in the open-architecture volume;
   ensure the second slots to be continuous in the open-architecture volume so as not to be mixed with the second slots of another mainframe volume; and
   create mapping information indicating a mapping relationship between the ensured second slots and the range of the first slot.

6. The storage system according to claim 2, wherein the processor is further configured to, when a process of a predetermined function for the second slot is performed, the predetermined function being different from the I/O process performed to and from the storage device, refer to the mapping information, identify the first slot where the second slot is stored, and perform the process using the identified first slot as a unit.

7. The storage system according to claim 6, wherein the predetermined function includes at least one of Thin Image, Global-Active Device, Adaptive Data Reduction, or REST API.

8. A data processing method of a storage system including a storage device, a processor, and a storage unit, the data processing method being executed by the storage system and comprising causing the processor to:
   provide a volume configured on the storage device to a mainframe server;
   manage data handled by an open-architecture server, using a first slot having a first slot length as a unit, in the volume;
   manage data handled by the mainframe server, using a second slot having a second slot length shorter than the first slot length as a unit, the first slot storing therein a predetermined number of the second slots, in the volume;

perform a process using one of the first slot and the second slot as a unit, depending on a type of the process.

9. The data processing method of a storage system according to claim 8, the data processing method further comprising:

causing the storage unit to store therein mapping information indicating a mapping relationship between the first slot and the second slot in the volume; and further causing the processor to, when a request for an I/O process is received from the mainframe server, identify the second slot storing therein target data for which the I/O process is requested, based on the mapping information, and the I/O process is performed on the target data, using the second slot as a unit.

10. The data processing method of a storage system according to claim 9, the data processing method further comprising causing the processor to:

calculate a slot number of the second slot in which a piece of write data received from the mainframe server is to be stored, based on a predetermined calculation formula and destination information included in a reception frame for storing therein a write request for the piece of write data; and determine whether the second slot corresponding to the slot number is retained on a cache memory configured on the storage unit, and when it is determined that the second slot corresponding to the slot number is retained on the cache memory, write the piece of write data to the second slot retained on the cache memory, and when it is determined that the second slot corresponding to the slot number is not retained in the cache memory, acquire the second slot corresponding to the slot number from the volume, and retain the second slot on the cache memory, and write the piece of write data to the second slot retained on the cache memory.

11. The data processing method of a storage system according to claim 9, the data processing method further comprising causing the processor to:

calculate a slot number of the second slot for storing therein a piece of read data, based on a predetermined calculation formula and destination information included in a reception frame for storing a request for reading the piece of read data, the reception frame being received from the mainframe server;

determine whether the second slot corresponding to the slot number is retained on a cache memory configured on the storage unit;

when it is determined that the second slot corresponding to the slot number is retained on the cache memory, read the piece of read data from the second slot retained in the cache memory; and when it is determined that the second slot corresponding to the slot number is not retained on the cache memory, acquire the second slot corresponding to the slot number from the volume, and retain the second slot on the cache memory, and read the piece of read data from the second slot retained on the cache memory.

12. The data processing method of a storage system according to claim 9, the data processing method further comprising causing the processor to:

create an open-architecture volume including the first slot, on the storage device;

pool the created open-architecture volume;

create a mainframe volume including the second slots from the pooled open-architecture volume, the first slot storing therein a predetermined number of the second slots;

create a range of the first slots in the open-architecture volume;

ensure the second slots to be continuous in the open-architecture volume; and create mapping information indicating a mapping relationship between the ensured second slots and the range of the first slot.

13. The data processing method of a storage system according to claim 9, the data processing method further comprising causing the processor to, when a process of a predetermined function for the second slot is performed, the predetermined function being different from the I/O process performed to and from the storage device, refer to the mapping information, identify the first slot where the second slot is stored, and perform the process using the identified first slot as a unit.

14. The data processing method of a storage system according to claim 13, wherein the predetermined function includes at least one of Thin Image, Global-Active Device, Adaptive Data Reduction, or REST API.

15. A data processing program in a storage system including a storage device, a processor, and a storage unit, the data processing program causing a computer to function as the storage system and to execute:

providing a volume configured on the storage device to a mainframe server;

managing data handled by an open-architecture server, using a first slot having a first slot length as a unit, in the volume;

managing data handled by the mainframe server, using a second slot having a second slot length shorter than the first slot length as a unit, the first slot storing therein a predetermined number of the second slots, in the volume;

performing a process using one of the first slot and the second slot as a unit, depending on a type of the process.

* * * * *